US008401082B2

(12) United States Patent
Ye et al.

(10) Patent No.: US 8,401,082 B2
(45) Date of Patent: Mar. 19, 2013

(54) METHODS AND SYSTEMS FOR REFINEMENT COEFFICIENT CODING IN VIDEO COMPRESSION

(75) Inventors: Yan Ye, San Diego, CA (US); Yiliang Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1624 days.

(21) Appl. No.: 11/502,883

(22) Filed: Aug. 10, 2006

(65) Prior Publication Data

US 2007/0223580 A1    Sep. 27, 2007

Related U.S. Application Data

(60) Provisional application No. 60/786,800, filed on Mar. 27, 2006, provisional application No. 60/830,199, filed on Jul. 11, 2006.

(51) Int. Cl.
*H04N 7/12* (2006.01)
*H04N 11/02* (2006.01)
*H04N 11/04* (2006.01)

(52) U.S. Cl. .................................. 375/240.23
(58) Field of Classification Search ........... 375/240.09–240.19, 240.02, 240.03, 375/240.12, 240.23, 240.28, 232; 341/50, 341/67, 52, 57; 382/238, 239, 248
See application file for complete search history.

(56) References Cited

U.S. PATENT DOCUMENTS

| 4,399,467 A | 8/1983 | Subramaniam |
| 6,980,597 B1 | 12/2005 | Ling |
| 2004/0001547 A1* | 1/2004 | Mukherjee ............... 375/240.16 |
| 2005/0185714 A1 | 8/2005 | Lin et al. |
| 2006/0008002 A1* | 1/2006 | Kirenko .................. 375/240.11 |
| 2006/0008009 A1 | 1/2006 | Bao et al. |
| 2007/0046504 A1* | 3/2007 | Ridge et al. ..................... 341/50 |
| 2007/0069926 A1* | 3/2007 | Lee et al. ......................... 341/67 |

FOREIGN PATENT DOCUMENTS

| JP | 2008526119 A | 7/2008 |
| JP | 2009532990 | 9/2009 |
| KR | 1020010080666 | 8/2001 |
| RU | 2189120 | 9/2002 |
| RU | 2335845 | 10/2008 |
| WO | 99017257 | 4/1999 |
| WO | WO0035187 A1 | 6/2000 |
| WO | 07029945 | 3/2007 |

OTHER PUBLICATIONS

Successive Coefficient Refinement for Embedded Lossless Image Compression; Charles D. Creusere Naval Air Warfare Center Weapons Division China Lake, CA 93555; IEEE Aug. 6, 2002.*
International Search Report—PCT/US07/064912, International Search Authority—European Patent Office—Nov. 26, 2007.

(Continued)

*Primary Examiner* — Sath V Perungavoor
*Assistant Examiner* — Nathnael Aynalem
(74) *Attorney, Agent, or Firm* — Brent A. Boyd

(57) ABSTRACT

A method for coding refinement coefficients in a signal-to-noise ratio (SNR) scalable enhancement layer of a compressed video sequence is disclosed. A video sequence is received. A prediction of an original video signal in a current frame is constructed from the video sequence. A residual signal is formed by subtracting the prediction of the original video signal from the original video signal in the current frame. A transform is applied to the residual signal. A plurality of transform coefficients is quantized. A refinement coefficient is mapped to a ternary refinement symbol. Refinement symbols are grouped in a certain coding order. The refinement symbol groups are coded using variable length codes.

30 Claims, 15 Drawing Sheets

OTHER PUBLICATIONS

Y. Ye, Y. Bao: "Improvements to FGS layer variable length coder", JVT 19th meeting. Mar. 31, 2006-Apr. 7, 2006, XP002458086.

Shima M: "CE1: Complexity reduction for adaptive VLC", Geneva: ISO, CH. Jan. 10, 2006, XP030006289.

X. Wang, M. Karczewicz: "Multiple FGS lyer coder for low-delay applications", JVT 18th Meeting, Jan. 14, 2006-Jan. 20, 2006, XP002458084.

Ridge J et al: "Variable length codes for SVC", JVT 17th Meeting, Oct. 14, 2005-Oct. 21, 2005, XP002458085.

Wen-Hsiao Pend et al: "Context-based binary arithmetic coding for the fine granuality scalability" Signal Processing and its applications, 2003. Proceedings. Seventh international symposium on Jul. 1-4, 2003, Piscataway, NJ, USA, IEEE, vol. 1, Jul. 1, 2003 pp. 105-108, XP010653140.

Joint Video Team (JVT) of ISO/IEC MPEG & ITU-T VCEG, Complexity reduction for adaptive VLC, 18th Meeting: Bangkok, JVT-R021, Jan. 14-20, 2006.

Written Opinion—PCT/US2007/064912, International Search Authority, European Patent Office, Nov. 26, 2007.

Taiwan Search Report—TW096110564—TIPO—Sep. 16, 2011.

* cited by examiner

|   |   |   |   |
|---|---|---|---|
| 4 _608a_ |   |   |   |
| 3 _608b_ |   | _606b_ |   |
| _606a_ |   |   |   |
|   |   |   |   |

602

|   |   |   |   |
|---|---|---|---|
| 0 _608_ |   |   |   |
| -1 _608_ |   | 2 _606_ |   |
| -1 _606_ |   |   |   |
|   |   |   |   |

| coeff_ref_flag | coeff_ref_dir_flag | ref_symbol |
|---|---|---|
| 0 | - | 0 |
| 1 | 0 | 1 |
| 1 | 1 | 2 |

| 4<br>_1116_ | | | |
|---|---|---|---|
| 3<br>_1116_ | | | |
| | | | |
| | | | |

1102

| 0<br>_1110_ | | | |
|---|---|---|---|
| -1<br>_1110_ | | 2<br>_1108_ | |
| -1<br>_1108_ | | | |
| | | | |

1104

| 1<br>_1112_ | | _1_<br>_1116_ | |
|---|---|---|---|
| 0<br>_1112_ | | 1<br>_1114_ | |
| 0<br>_1114_ | | | |
| | | | |

| S0,0 | R0,0 | | |
|---|---|---|---|
| R0,1 | | | |
| | | | |
| | | | |

1202

| R1,0 | | S1,1 | |
|---|---|---|---|
| | | S1,2 | |
| S1,0 | | | |
| | | | |

1204

FGS Coding Order
S0,0 in Block 1202
S1,0 in Block 1204
EOB for Block 1202
S1,1 in Block 1204
R0,0 in Block 1202
S1,2 in Block 1204
R0,1 in Block 1202
EOB for Block 1204
R1,0 in Block 1204

| S0,0 | R0,0 | | |
|---|---|---|---|
| R0,1 | | | |
| | | | |
| | | | |

1302

1306

| R1,0 | | S1,1 | |
|---|---|---|---|
| | | S1,2 | |
| S1,0 | | | |
| | | | |

1304

FGS Coding Order
S0,0 in Block 1302
R1,0 in Block 1304
EOB for Block 1302
S1,0 in Block 1304
R0,0 in Block 1302
R0,1 in Block 1302
S1.1 in Block 1304
S1,2 in Block 1304
EOB for Block 1304

METHODS AND SYSTEMS FOR REFINEMENT COEFFICIENT CODING IN VIDEO COMPRESSION

RELATED APPLICATIONS

This application claims priority to co-assigned U.S. Provisional Patent Application Ser. No. 60/786,800 (060942P1), filed on Mar. 27, 2006, entitled "Refinement Coefficient Coding for Fine Granularity Scalability," with inventors Yan Ye and Yiliang Bao, and U.S. Patent Application Ser. No. 60/830, 199 (060942P2), filed on Jul. 11, 2006, entitled "Methods and systems for refinement coefficient coding in video compression," with inventors Yan Ye and Yiliang Bao, which are incorporated herein by reference.

TECHNICAL FIELD

The present disclosure relates generally to video processing. More specifically, the present disclosure relates to methods and systems for encoding and decoding information relating to video compression techniques.

BACKGROUND

Computer technologies have continued to progress in video compression techniques. Video compression refers to compression of digital video data. Video compression is desirable for efficient coding of video data in video file formats and streaming and broadcasting video formats. Compression is a conversion of data to a format that requires fewer bits, usually performed so that the data can be stored or transmitted more efficiently. Decompression, which is the inverse of compression, produces a replica of the original data.

Today, many video compression methods apply a certain type of discrete transform such as Discrete Cosine Transform (DCT) for reducing a remaining spatial redundancy in a prediction residual, which is generated using either temporal or spatial prediction techniques. Many video compression techniques also involve quantization, which may be either scalar quantization or vector quantization. After quantization, quantized coefficients may be entropy coded and placed into a compressed video bit stream. The compressed bit stream is then sent to a decoder, which will decompress the bit stream and recover a close approximation of the original video data.

Video compression techniques may benefit consumers of various forms of media. For example, in broadcast engineering, digital television is made practical by video compression. TV stations can broadcast not only HDTV, but multiple virtual channels on the same physical channel as well. Digital video broadcast may use the MPEG-2 standard video compression format. H.264/MPEG-4 and VC-1 are beginning to emerge as new standards in video compression.

Unfortunately, known systems and methods for coding information in video compression suffer from various drawbacks. Accordingly, benefits may be realized by improved systems and methods for coding information in video compression. Some systems and methods for coding information in video compression are described herein.

BRIEF DESCRIPTION OF THE DRAWINGS

FIG. 6 illustrates one embodiment of classifying significant and refinement coefficients;

FIG. 9 illustrates one embodiment of refinement symbols that may be associated with syntaxes used in refinement coding;

FIG. 11 illustrates one embodiment of multiple fine granularity scalability (FGS) layers;

FIG. 12 illustrates one embodiment of a solution to a problem due to grouping of refinement coefficients when significance and refinement coding are interleaved;

FIG. 13 illustrates another embodiment where significance coding and refinement coding may be interleaved and subband FGS coding order is used;

DETAILED DESCRIPTION

Figure 1:
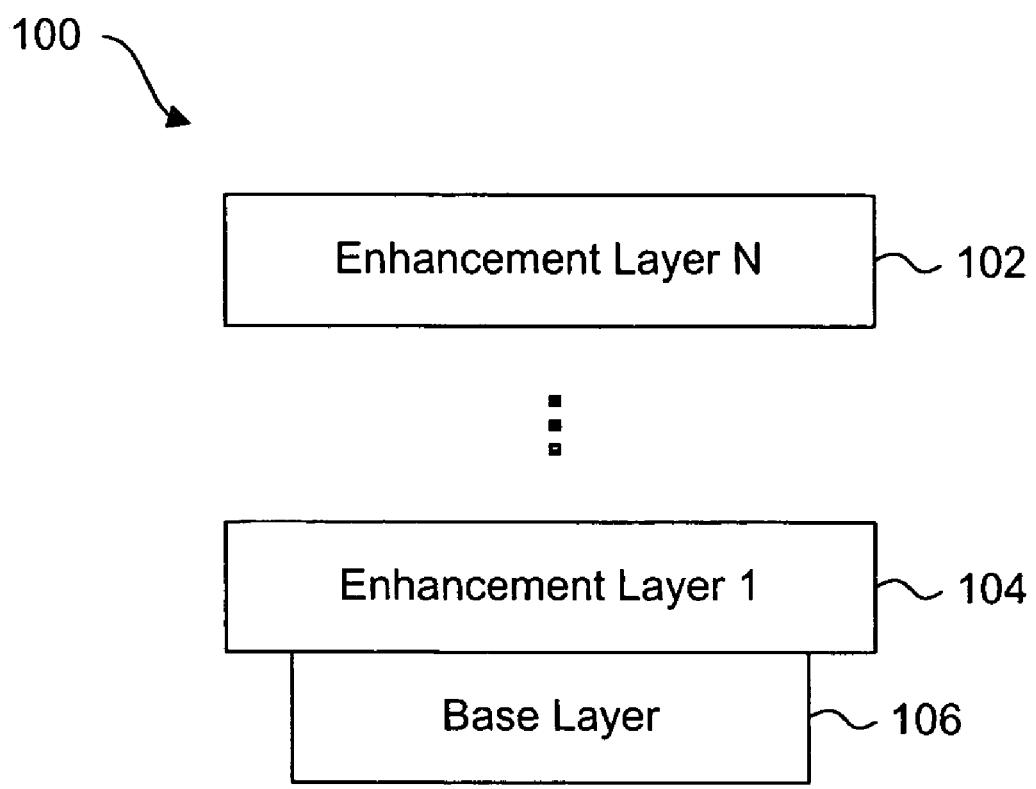
FIG. 1 illustrates one embodiment of a scalable video coding bitstream structure.

A method for coding refinement coefficients in a signal-to-noise ratio ("SNR") scalable enhancement layer of a compressed video sequence is disclosed. A video sequence is received. A prediction of an original video signal in a current frame is constructed from the video sequence. A residual signal is formed by subtracting the prediction of the original video signal from the original video signal in the current frame. A transform is applied to the residual signal. A plurality of transform coefficients is quantized. A refinement coefficient is mapped to a ternary refinement symbol. Refinement symbols are grouped in a certain coding order. The refinement symbol groups are coded using variable length codes.

A variable length coding table is adaptively selected for different enhancement layers. In an embodiment, the variable length coding table is adaptively selected based on a probability estimation of the refinement symbols. The selection of a specific variable length coding table may be based on a level of an enhancement layer. In an embodiment, the selection of the specific variable length coding table is based on whether a coefficient is being refined for the first time or whether the coefficient has been refined in a previous layer.

In an embodiment, the method interleaves significant coefficients and refinement coefficients. A slice is identified that includes a plurality of blocks. The plurality of blocks may be scanned before the grouping of the refinement coefficients. An order is determined with which the refinement coefficients will be coded. The refinement coefficients may be stored in a queue according to the order that was determined.

In an embodiment, every fixed-number of consecutive refinement coefficients are coded together using the variable length coding table. In an embodiment, refinement coefficients of a slice are grouped together. A flushing operation may be performed. The variable length coding table includes a 27-entry variable length coding table, wherein the group length is three. The subband-based coding order is used on the enhancement layer.

An electronic device implementing a method for coding refinement coefficients in an SNR scalable enhancement layer of a compressed video sequence is also disclosed. The electronic device includes a processor and memory in electronic communication with the processor. Instructions stored in the memory are included. A video sequence is received. A prediction of an original video signal in a current frame is constructed from the video sequence. A residual signal is formed by subtracting the prediction of the original video signal from the original video signal in the current frame. A transform is applied to the residual signal. A plurality of transform coefficients is quantized. A refinement coefficient is mapped to a ternary refinement symbol. Refinement symbols are grouped in a certain coding order. The refinement symbol groups are coded using variable length codes.

A computer-readable medium including instructions for implementing a method for coding refinement coefficients in an SNR scalable enhancement layer of a compressed video sequence is also disclosed. A video sequence is received. A prediction of an original video signal in a current frame is constructed from the video sequence. A residual signal is formed by subtracting the prediction of the original video signal from the original video signal in the current frame. A transform is applied to the residual signal. A plurality of transform coefficients is quantized. A refinement coefficient is mapped to a ternary refinement symbol. Refinement symbols are grouped in a certain coding order. The refinement symbol groups are coded using variable length codes.

A method for decoding refinement coefficients in an encoded video sequence is also disclosed. An encoded video sequence is received. Refinement symbols are decoded using a variable length coding table. Refinement coefficients are decoded using the refinement symbols, wherein the refinement coefficients were grouped in a certain coding order. A plurality of transform coefficients is dequantized. An inverse transform is applied to a refinement signal. A video sequence is constructed.

In an embodiment, the encoded video stream includes interleaved significant symbols and refinement symbols. A location of the refinement coefficients being requested is stored. A sign of the corresponding base layer coefficient is stored. A counter is incremented that relates to a number of requests made. In an embodiment, it is determined if the counter reaches a predefined count. A read operation is invoked causing normal variable length coding table decoding. A group of refinement symbols are obtained.

Various embodiments of the disclosure are now described with reference to the Figures, where like reference numbers indicate identical or functionally similar elements. The embodiments of the present disclosure, as generally described and illustrated in the Figures herein, could be arranged and designed in a wide variety of different configurations. Thus, the following more detailed description of several embodiments of the present disclosure, as represented in the Figures, is not intended to limit the scope of the disclosure, as claimed, but is merely representative of the embodiments of the disclosure.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software may depend upon the particular application and design constraints imposed on the overall system. Skilled artisans may implement the described functionality in varying ways for each particular application, but such implementation decisions should not be interpreted as causing a departure from the scope of the present disclosure.

Where the described functionality is implemented as computer software, such software may include any type of computer instruction or machine-executable code stored within a memory device and/or transmitted as electronic signals over a system bus or network. Software that implements the functionality associated with components described herein may comprise a single instruction, or many instructions, and may be distributed over several different code segments, among different programs, and across several memory devices.

After general video compression techniques, such as prediction, transform, and quantization, a next step is to perform entropy coding on syntax elements and quantized coefficients to form a bitstream. In a video decoder, an inverse process is performed. Syntax elements and the quantized coefficients are decoded from the bitstream. Then inverse quantization and inverse transform steps are performed. Finally, a reconstructed residual is added to the prediction to reconstruct the video signal.

A Joint Video Team (JVT), which consists of the video coding experts from ISO/IEC MPEG and ITU-T VCEG, is working on the Scalable Video Coding (SVC) extension to H.264/AVC. The common software, called JSVM (Joint Scalable Video Model), is being used by the participants. JSVM supports various scalability features. An SVC bitstream can have fine-granularity scalability, spatial scalability, temporal scalability, or any combinations of the three.

Fine granularity scalability, hereafter referred to as FGS, is an important and highly desired feature for video coding. This feature allows the compressed video bitstream to be almost arbitrarily truncated, while at the same time providing the end user with graceful degradation of the decoded video quality. As the video decoder receives and decodes more bits in this layer, it will produce better video quality. Moreover, FGS in JSVM has been designed in a way that the improvement in video quality is evenly spread out across the entire video frame, as opposed to being concentrated within only a certain spatial area of the frame, since the latter case will be visually objectionable to the end viewer.

FGS achieves graceful improvement of video quality using bit-plane coding. If the base or previous layer video frame is quantized using a quantization parameter QP, then the current enhancement layer video is quantized using a quantization parameter typically around QP-6, which effectively cuts the quantization step size in half. As a result of lower quantization step size, more transform coefficients will become nonzero in the enhancement layer. All of the nonzero coefficients in the enhancement layer can be classified into three types: non-significant coefficients, significant coefficients, and refinement coefficients. "Non-significant" coefficients refer to those coefficients that are zero in the enhancement layer, and the corresponding coefficients in the base or previous layer are zero. "Significant" coefficients refer to those coefficients that become nonzero in the enhancement layer and the corresponding coefficients in the base or previous layer are zero. "Refinement" coefficients refer to those coefficients that are already nonzero (i.e., significant) in the base or previous layer. Their values will be refined in the current enhancement layer.

Because refinement coefficients have different statistics from other coefficients, they are coded separately in the FGS layer. Similar to H.264/AVC, the SVC draft recommendation also supports two entropy coding modes: the Context-based Adaptive Binary Arithmetic Coding (CABAC) mode and the Context-based Adaptive Variable Length Coding (CAVLC) mode. Details for an improved refinement coefficient coding scheme in the CAVLC mode is provided that is shown to not only improve coding efficiency, but also greatly reduce implementation complexity for both the encoder and decoder.

In the FGS layer, refinement coefficients are sent using two syntax elements: coeff_refinement_flag and coeff_refinement_direction_flag. The first syntax element, coeff_refinement_flag, specifies whether or not a refinement coefficient level is equal to 0. Without losing generality, it is assumed that if coeff_refinement_flag is equal to 0 the value of a refinement coefficient level is equal to 0, while coeff_refinement_flag equal to 1 specifies that the value of a refinement coefficient level is either equal to −1 or equal to 1. The second element, coeff_refinement_direction_flag, specifies whether the sign of a transform coefficient refinement level is the same or different from the sign of its base or previous layer representation. Without losing generality, it is assumed that if coeff_refinement_direction_flag is equal to 0, the sign of the transform coefficient refinement level is equal to the sign of the corresponding coefficient in the base layer; otherwise, the refinement level has the opposite sign.

In the CAVLC mode, one way of coding the refinement coefficients in the FGS layer is to process the refinement coefficients block by block. Once the video coder starts coding the refinement coefficients in a block, all of the refinement coefficients in the current block are coded before the video coder starts coding other coefficients. Such a scheme was once adopted in one version of JSVM.

Table 1 provides such a block-based refinement encoding process summarized in the following pseudo-code.

TABLE 1

```
// refinement level coding
// vlcTab1 is the VLC table to be used for coding refinement level
while (still refinement coefficient left in the current block) {
    get the next refinement coefficient in the zig-zag order
    let m = level of the coefficient
    code the level m using the current vlcTab1
    update the refinement level stats
    update the value of vlcTab1
}
flush the refinement level bits left in the bit buffer
// refinement direction flag coding
// vlcTab2 is the VLC table to be used for coding refinement direction
while (still refinement coefficient left in the current block) {
    get the next refinement coefficient in the zig-zag order
    if(current refinement level is non-zero)
    {
        if(level has the same sign as base coeff)
            let refinement direction s = 0
        else
            let refinement direction s = 1
        code the direction s using the current vlcTab2
        update the refinement direction stats
        update the value of vlcTab2
    }
}
flush the refinement direction bits left in the bit buffer
```

The refinement decoding process is carried out in the reverse order to recover the syntaxes coeff_refinement_flag and coeff_refinement_direction_flag. With these two flags, together with the base or previous layer coefficients, the decoder is able to reconstruct the refinement coefficients. The decoder also maintains and updates statistical information in buffers in the same way to stay in sync with the encoder.

In Table 1, vlcTab (vlcTab1 or vlcTab2) may take one of three values, indicating different ways to perform VLC coding on the refinement flag syntaxes. If vlcTab=0, the refinement syntaxes are sent bit by bit (flag coding). If vlcTab=1, the refinement syntaxes are sent in groups of three bits. If vlcTab=2, the refinement syntaxes are sent in groups of four bits. The value of vlcTab is adaptively determined according to the accumulated statistics of the refinement coefficients in the current video slice. Also, both the encoder and the decoder keep track of the value of the most probable symbol (MPS) and switch the actual symbol being coded if the MPS changes from 0 to 1 or vice versa.

The current CAVLC refinement coding method may have relatively high computational complexity. For example, the current method may need to maintain and update the accumulated statistics of both refinement syntaxes (level syntax and direction syntax). The current method may need to update the values of vlcTab and MPS. The current method may need to make sure the probability counts for 0 and 1 will not overflow by scaling them back when needed. Changing the group length adaptively may also complicate the implementation.

Even with its relative high complexity, the current refinement coding may be inefficient. Simulations show that, for some sequences, the CAVLC refinement coding can take up to twice as many bits (100% penalty) compared the CABAC refinement coding, whereas the overall bit rate penalty of using the CAVLC mode instead of CABAC is usually only around 15% or less. This inefficiency is largely due to the fact that the CAVLC refinement coding carries out two rounds of bit flushing operations at the end of each block (one for the level syntax, and the other for the direction syntax). If a block contains very few refinement coefficients (e.g., only 1 or 2 coefficients), then the frequent flushing operations may make it impossible to group 3 or 4 bits together, hence incurring a heavy bit penalty because variable length coding cannot be used according to this scheme.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed disclosure(s)," unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

FIG. 1 illustrates one embodiment 100 of a scalable video coding bitstream structure referred to as Fine Granularity Scalability (FGS). In FGS, a video sequence is compressed into a single video stream with at least two layers: a base layer 106 and an enhancement layer 104. As illustrated, FGS may further include N enhancement layers 102.

In one embodiment, the base layer 106 is a nonscalable coding of the video sequence and typically has the lowest quality of the video sequence. The enhancement layer 104 and the N enhancement layers 102 have varying levels of quality above that of the base layer 106. Decoding each additional enhancement layer coded after the base layer 106 results in an increased quality of the video sequence. In addition, FGS bitstream has one significant advantage that during or after encoding, the bits pertaining to the enhancement layer 104 and the N enhancement layers 102 may be truncated (reducing the bit rate and thus the decoded picture quality) in real time. This provides flexible control over the transmitted bit rate and allows the enhancement layer 104 and the N enhancement layers 102 to be adjusted to match the available transmission bit rate.

Figure 2:
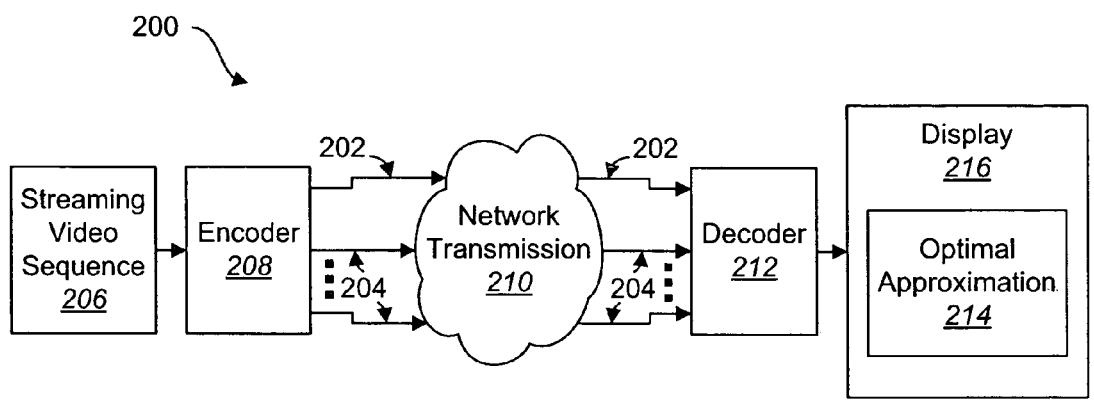
FIG. 2 illustrates one embodiment of a base layer and a plurality of enhancement layers being sent from an encoder across a network to a decoder.

FIG. 2 is a network block diagram 200 illustrating the base layer 202 and N enhancement layers 204 being sent from an encoder 208 across a network 210 to a decoder 212. The decoder 212 may decode and use the base layer 202 and all or portions of one or more enhancement layers 204. The decoder 212 constructs an optimal approximation 214 of the original video sequence 206. In one embodiment, the optimal approximation 214 is displayed on a display 216 such as a computer monitor, television, PDA, projector, etc. A video sequence 206 is encoded as a base layer 202 and one or more enhancement layers 204. The lower quality base layer 202 represents the minimum quality standard and each of the enhancement layers 204 are improvements upon the base layer 202 picture quality. In one embodiment, the video sequence 206 is encoded using the FGS video coding format as explained in FIG. 1. The FGS coding format may be particularly useful for video streaming and broadcasting applications where the available transmission bandwidth may not be known in advance. During or after encoding, the enhancement layers 204 may be truncated arbitrarily to match the available transmission bit rate. As the available bit rate changes, the enhancement layers 204 can be truncated accordingly in real time to provide the optimal quality decoded video sequence with respect to the current bandwidth. For example, the network 200 may truncate the enhancement layers 204 and then send bit streams with different bit rates to different destinations.

Figure 3:
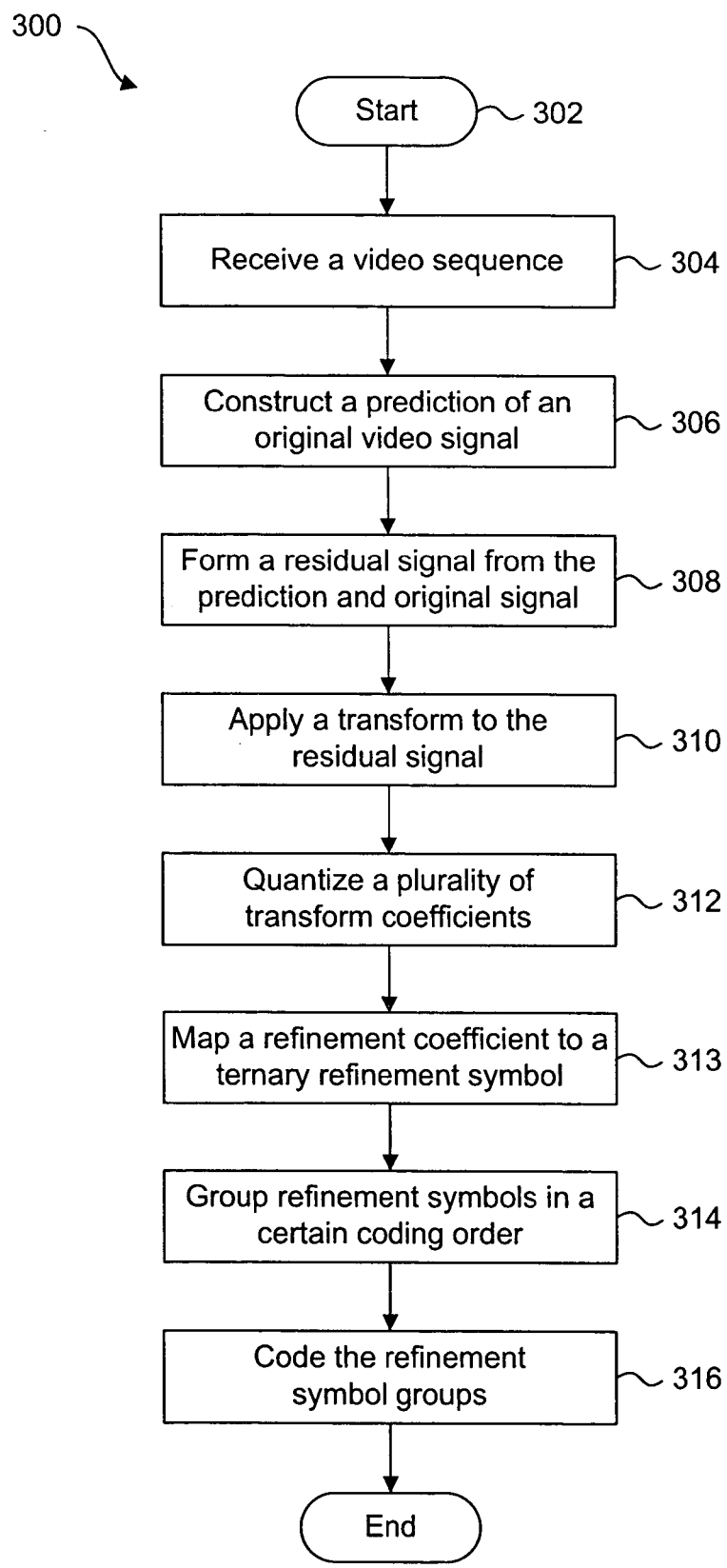
FIG. 3 illustrates a method for encoding information.

FIG. 3 illustrates a method 300 for encoding information. In one embodiment, the information to be encoded comprises a video sequence. The method 300 may be carried out within a video encoder, and the inverse of the method 300 may be executed by a video decoder. An encoder is a device used to change a signal or data into a code. The decoder may then produce the original signal or an approximation of the original signal from the code. The encoder and decoder may be collectively referred to as a video CODEC, which encodes a source image or video sequence into a compressed form and decodes this to produce a copy or approximation of the source sequence.

The method 300 begins 302 with the encoder receiving 304 the video sequence. In one embodiment, the video sequence is an uncompressed video signal. The encoder begins to compress the video sequence by exploiting the similarities between neighboring video frames and constructing 306 a prediction of the current video signal. The prediction is formed from one or more previous or future frames and is improved by compensating for differences between the frames. A residual signal is then formed 308 by subtracting the prediction frame from the actual current frame. The encoder makes use of the similarities between neighboring samples of the prediction residual to reduce spatial redundancy.

The method 300 continues by applying 310 a transform to the residual signal to reduce remaining spatial redundancy. The transform converts the prediction residual signals into another domain in which they are represented by transform coefficients. The coefficients are quantized 312 to remove insignificant values, leaving a small number of significant coefficients that provide a more compact representation of the residual samples. In one embodiment, the coefficients are quantized using QP-6, which effectively reduces the quantization step size in half. As a result of a reduced quantized step size, an increased quantity of transform coefficients will become nonzero in the current frame. For example, the prediction residual being encoded using the method 300 may be in an enhancement layer. If the previous layer of the video frame or the base layer of the video frame were quantized 312 using the quantization parameter QP, then the current enhancement layer is quantized 312 using QP-6.

In one embodiment, the nonzero quantized coefficients in the enhancement layer may be classified as non-significant, significant, or refinement coefficients. "Non-significant" coefficients refer to those coefficients that are zero in the base or previous layer and remain zero in the current enhancement layer. "Significant" coefficients refer to those coefficients that are zero in the base or previous layer but become nonzero coefficients in the current enhancement layer. "Refinement" coefficients refer to those coefficients that are already non-zero in a base or previous layer. In one embodiment, each refinement coefficient is mapped 313 to a ternary refinement symbol. The ternary refinement symbol may have one of three values. The encoder scans the current enhancement layer and groups 314 the refinement symbols in a certain coding order. In one embodiment, the encoder groups 314 the consecutive refinement symbols in the subband-based coding order. Each group of refinement symbols is referred to as a "Refinement Symbol Group." The encoder then codes 316 the Refinement Symbol Groups and adds these codes to the bitstream. In one embodiment, the encoder codes 316 a Refinement Symbol Group using a variable length code (VLC) from a VLC table. In another embodiment, the VLC table used to encode one Refinement Symbol Group may be dynamically selected from a set of VLC tables, based on the current estimation of the statistical distribution of the refinement coefficients.

In an additional embodiment, the encoder may encode the refinement symbols from multiple enhancement layers. For example, the encoder may encode multiple enhancement layers under the FGS coding format. In one embodiment, the Refinement Symbol Groups from the multiple FGS enhancement layers are coded using an adaptive VLC table selection. In another embodiment, the VLC table is fixed for one FGS layer, but may be different from the VLC table used in another FGS layer.

Figure 4:
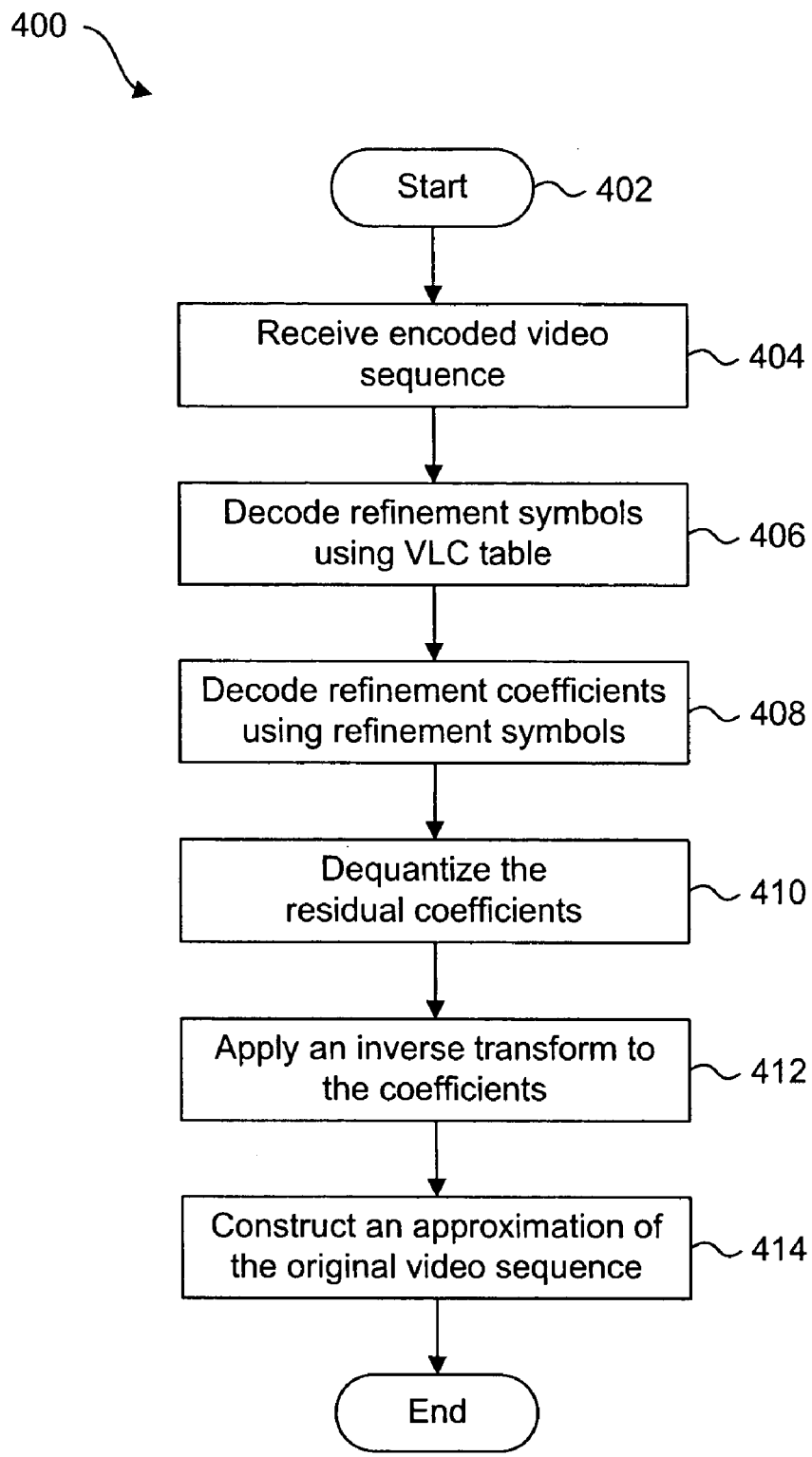
FIG. 4 illustrates one embodiment of a method to decode an encoded video sequence.

FIG. 4 illustrates one embodiment of a method 400 to decode an encoded video sequence. The decoding method 400 may be an inverse of the encoding method 300 of FIG. 3. The decoding method 400 begins 402 by a decoder receiving 404 the encoded video sequence. The encoded video sequence may also be referred to as the bitstream. The decoder decodes 406 the Refinement Symbol Groups using the VLC table. If the Refinement Symbol Groups are encoded using the adaptive VLC tables based on the statistical distribution of the refinement coefficients, the same statistical information is used in the decoder to select the correct VLC table. If encoded refinement symbols from multiple enhancement layers are received by the decoder, the decoder may adapt the VLC table used to decode the refinement symbols according to their respective enhancement layers.

The method 400 continues and the decoder decodes 408 the refinement coefficients using the recently decoded refinement symbols. The decoder then proceeds to dequantize 410 the decoded refinement coefficients before they are added back to the base or previous layer dequantized coefficients. The method 400 proceeds by applying 412 an inverse transform to the dequantized coefficients. In one embodiment, the inverse transform may include the inverse discrete cosine transform. After the decoder applies 412 the inverse transform to the refinement coefficients, the decoder constructs 414 an approximation of the original video sequence as it existed before the encoding method 300 of FIG. 3.

Figure 5:
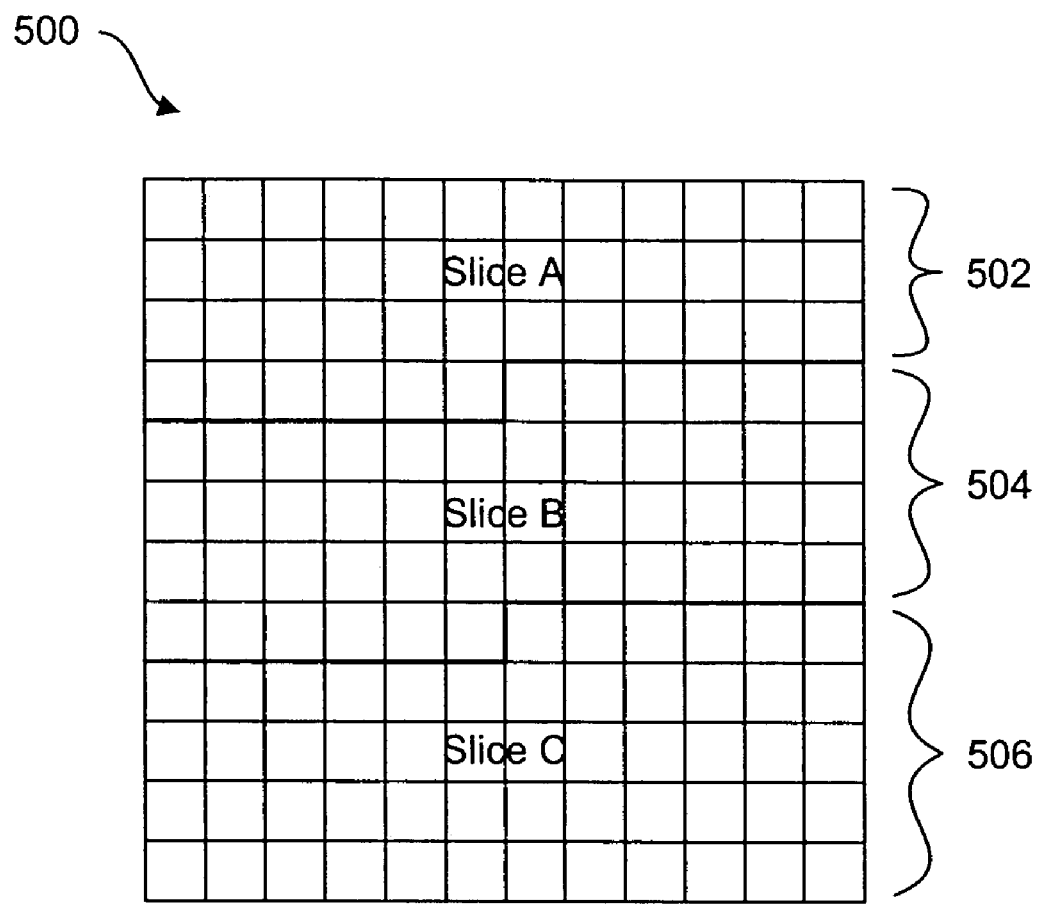
FIG. 5 illustrates one embodiment of a picture frame divided into a plurality of macroblocks.

FIG. 5 illustrates one embodiment of a video frame 500 divided into a plurality of macroblocks. Macroblocks are the basic data units in the decoding process. As illustrated, the video frame 500 may be partitioned into the plurality of fixed-sized macroblocks that each includes a sample of the video frame 500. In one embodiment, each macroblock includes a sample of 16×16 pixels. In an additional embodiment, each macroblock includes a luminance (luma) component and two chrominance (chroma) components. The luma component relates to the brightness of the particular sample while the chroma components relate to the color characteristics of the sample. In one embodiment, the video frame 500 is further partitioned into a plurality of slices, slice A 502, slice B 504, and slice C 506. A slice is a sequence of macroblocks which are processed consecutively in a certain coding order. For example, slice A 502 and the macroblocks contained within slice A 502, may be encoded and sent to the decoder before slice B 504 and slice C 506. In an additional embodiment, the order of encoding the various slices 502, 504, and 506 and sending them to the decoder may be arbitrary. For example, slice B 504 may be encoded sent to the decoder before the other slices. Similarly, slice C 506 may be encoded and sent to the decoder before the other two slices. Each macroblock in the N enhancement layers corresponds to a macroblock in each of the N−1 enhancement layers and base layer.

FIG. 6 illustrates an example of how to classify coefficients. A base layer coefficient block 602 and an enhancement layer coefficient block 604 are provided. The blank spaces in the base layer 602 and the enhancement layer 604 represent coefficients of zero. These coefficients are referred to as non-significant coefficients. The remaining spaces, 606, 608, 608a, and 608b each represent a coefficient that may have a nonzero value. In one embodiment, the base layer coefficient block 602 is in previous enhancement layer using the FGS video coding format. As previously explained, during the encoding method 300 of FIG. 3, transform coefficients are quantized. After quantization, the nonzero coefficients in the enhancement layer coefficient block 604 that their corresponding coefficients in the base layer coefficient block 602 are zero are referred to as significant coefficients 606. These coefficients whose corresponding coefficients in the base layer are nonzero are referred to as refinement coefficients 608. Because significant coefficients 606 and refinement coefficients 608 have different statistics, they are coded separately in the enhancement layer 604 following the FGS coding format.

In one embodiment, significant coefficients 606 are those coefficients whose corresponding coefficients 606a and 606b (the coefficient representing the same subband) in the base or previous layer are zero. Refinement coefficients 608 are those coefficients whose corresponding coefficients 608a and 608b in the base or previous layer are nonzero.

Figure 7:
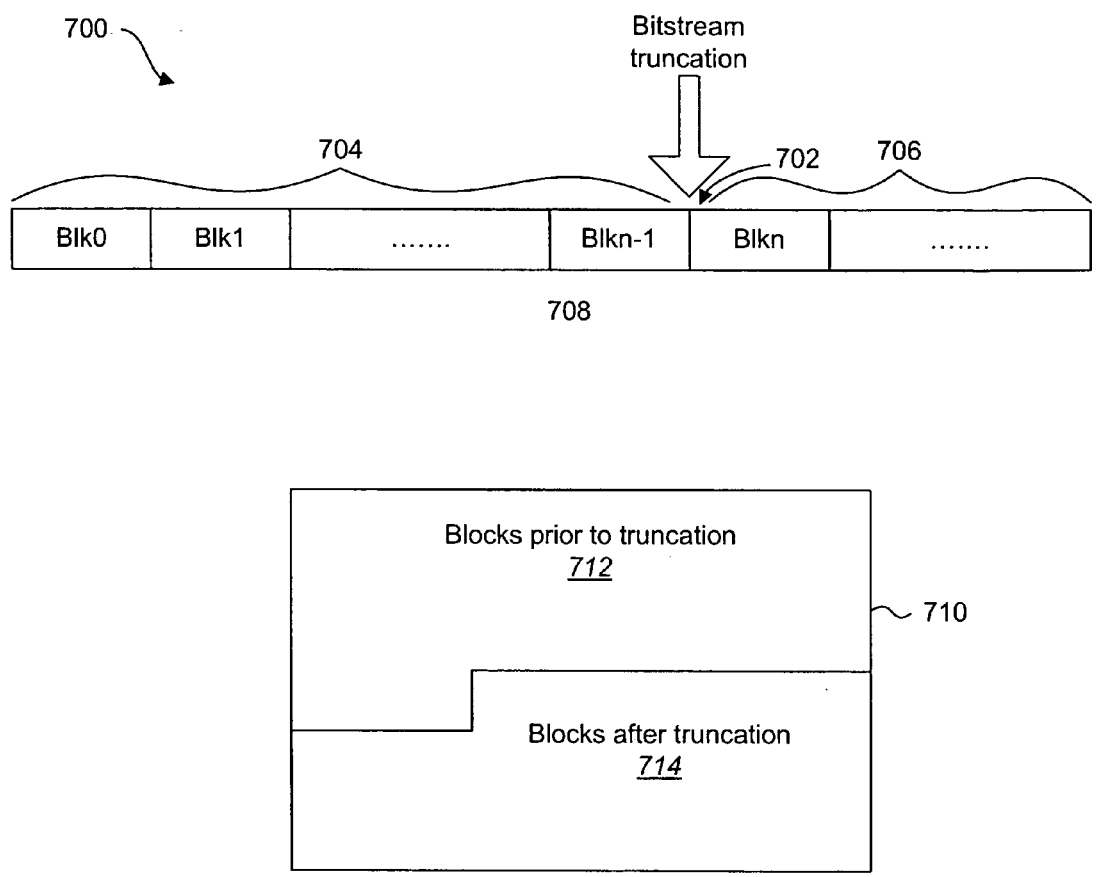
FIG. 7 illustrates a drawback of one variable length coding (VLC) refinement coding scheme.

FIG. 7 illustrates a drawback 700 of the current CAVLC refinement coding scheme in which the block-by-block coding order is used. The block-by-block order will inherently generate spatially uneven quality improvement within the video frame 710. As shown in FIG. 7, when the bitstream 708 is truncated, all the video blocks represented in the bitstream 708 prior to truncation 704 (blocks 0, 1, . . . n−1) will have better video quality 712 compared to the video blocks 706 (blocks n and on) whose refinement coefficients are lost during truncation 714. A better order to encode these refinement coefficients is to use the subband-based coding order, which is detailed in the next Figure.

Figure 8:
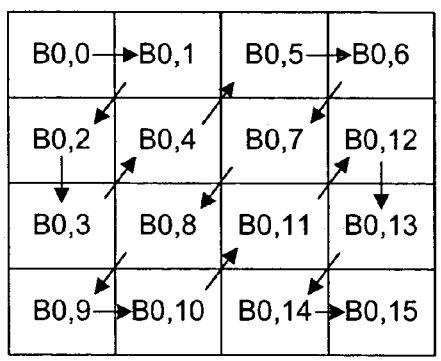
FIG. 8 illustrates one embodiment of a subband-based coding order.
Figure 8:
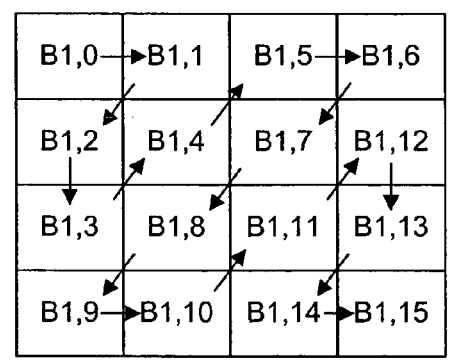
Figure 8:
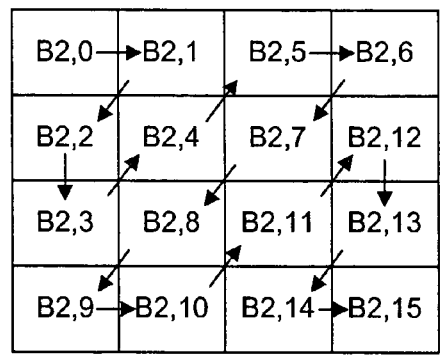

FIG. 8 illustrates one embodiment of the subband-based coding order 800. In one embodiment, a first block 802, a second block 804, and a third block 806 are three blocks of coefficients in the same enhancement layer. In one embodiment, the blocks 802, 804, and 806 are blocks in the first FGS enhancement layer such that the subband-based FGS coding order 800 may be extended to and used on the first FGS layer. Compared to the block-based order, the subband-based coding order 800 sends refinement coefficients according to the transform domain subband they belong to. In one embodiment, the notation Bx,y illustrated in the blocks 802, 804, and 806 may represent a coefficient in subband y and in block x. For example, B0,0 represents a coefficient in the first subband (subband 0) and in the first block 802.

In one embodiment, the encoder first encodes any refinement coefficients present at positions B0,0, B1,0, and B2,0. The encoder then encodes any refinement coefficients present at positions B0,1, B1,1, and B2, 1, and so forth. The subband coding order 800 facilitates the refinement coefficients to be encoded and sent according to the transform domain subband they belong to. Using the subband coding order 800 results in more even quality improvement spatially as more refinement bits are received.

FIG. 9 illustrates one embodiment 900 of refinement symbols (ref symbol) 906 that may be associated with the two syntaxes used in refinement coding, coeff_refinement_flag 902 and coeff_refinement_dir_flag 904. As previously explained, if a refinement coefficient has the value of 0, the syntax element coeff_refinement_flag 902 is assigned the value of 0. Accordingly, the ref symbol 906 assigned is also 0. If the refinement coefficient has a nonzero value, the coeff_ref_flag 902 is assigned the value of 1. If the refinement coefficient has the same sign as the corresponding refinement coefficient in the base layer or previous enhancement layer, the coeff_ref_dir_flag 904 is assigned the value of 0. If the sign of the refinement coefficient in the base layer or previous enhancement layer is opposite the sign of the refinement coefficient in the current layer being encoded, the coeff_ref_dir_flag 904 is assigned the value of 1. In another embodiment, the parameters defining the value of the coeff_ref_dir_flag 904 are reversed.

If the coeff_ref_dir_flag 904 is assigned the value of 0, the ref symbol 906 is assigned the value of 1 and if the coeff_ref_dir_flag 904 is assigned the value of 1, the ref symbol 906 is assigned the value of 2. The values of the ref symbol 906 are then encoded and included in the bitstream. One embodiment of encoding the values of the ref symbol 906 is provided below.

Figure 10:
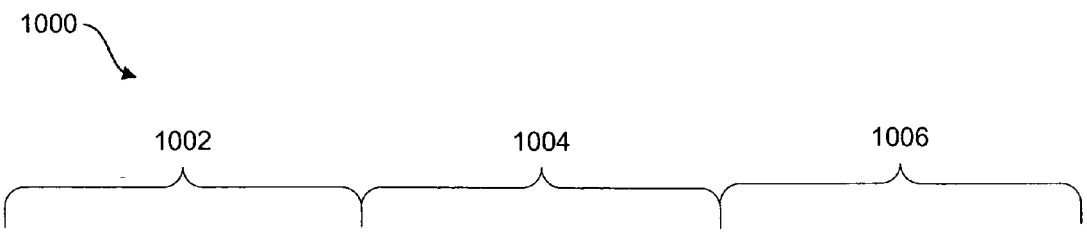
FIG. 10 illustrates one embodiment of a variable length coding (VLC) table.

FIG. 10 illustrates one embodiment of a variable length coding (VLC) table 1000 used to encode the values of the reference symbols as explained in FIG. 9. Under the subband coding order, consecutive refinement symbols may be grouped together and a Refinement Symbol Group 1002 is encoded using the VLC table 1000. The table 1000 includes a plurality of entries. Each entry has a value of a Refinement Symbol Group 1002 as explained in FIG. 9, a code length 1004 of variable length code for coding the Refinement Symbol Group 1002 of a particular value, and a code word 1006 of the variable length code for coding the Refinement Symbol Group 1002 of a particular value. The code word 1006 is then included in the bitstream and sent to the decoder.

In one embodiment, a single VLC table like the table 1000 is used in refinement coding, it is not necessary for the encoder and the decoder to constantly accumulate and update refinement symbol statistics, thus, the computational complexity may be greatly reduced. In another embodiment, a VLC table is selected from multiple tables based on the estimation of the statistical distribution of the refinement coefficients, the performance can be improved with additional complexity of probability estimation and table selection.

Referring now to FIG. 11, current SVC standards allow multiple layers on top of a discrete base layer 1102. When there is more than one FGS layer 1104 and 1106, starting from the second FGS layer 1106 and going up, all refinement coefficients belong to one of two classes: the "old" refinement coefficients are those that already have refinement coefficients in the previous FGS layer 1104, and the "new" refinement coefficients are those that just became significant in the previous FGS layer 1104 and are just entering the refinement stage in the current layer 1106. FIG. 11 provides an example of having two FGS layers 1104 and 1106. The first FGS layer 1104 contains significant coefficients 1108 as well as refinement coefficients 1110. The second FGS layer 1106 includes "old" refinement coefficients 1112 as well as "new" refinement coefficients 1114. The coefficient 1116 is new significant coefficient in the second FGS layer 1106. The remaining blank positions are non-significant coefficients that have no nonzero values.

The two types of refinement coefficients 1112 and 1114 have different symbol probability distributions. Therefore, in one embodiment, it is better to use different VLC tables to encode them. Furthermore, different VLC coding tables may be used depending on the level of the current FGS layer. For example, a different VLC table may be used to encode the refinement coefficients included in the second FGS layer 1106 than that used to used the refinement coefficients included in the first FGS layer 1104. Hence, a coding table more tuned for such probability distribution should be used to improve performance. Such VLC table adaptation has very low complexity as it is solely based on the refinement coefficient class and the FGS layer level, rather than relying on collecting and updating the symbol statistics. In another embodiment, VLC table can be selected dynamically based on the estimation of the statistical distribution of the refinement coefficients for the current FGS layer.

FIG. 12 illustrates one embodiment 1200 of a solution to the problem due to grouping of refinement symbols when significance and refinement coding are interleaved. In FGS coding, the significance coding pass and the refinement coding pass for different blocks are usually interleaved together. One reason for this is that one block might contain fewer significant coefficients than the other block. When the significance coding pass of a certain block is over, the refinement pass for this block will start next, while the block next to this one will still be going through its significance coding pass. In one embodiment, the significance coding (of S0,0 and then EOB) for block A 1202 is over after two rounds. Then the refinement coding of R0,0 (and later R0,1) will start. But at the same time the significance coding of block B 1204 (coefficients S1,2 and EOB) is still ongoing.

Another reason for interleaved significance and refinement coding is the use of the subband coding order. FIG. 13 illustrates another embodiment 1300 where significance coding and refinement coding may be interleaved. In one embodiment, the coefficients are scanned in subbands. For example, when scanning the 0-th subband 1306, block A 1302 contains a significance coefficient S0,0. Hence, significance coding of S0,0 is carried out. Similarly, when the 0-th subband 1306 of block B 1304 is scanned, refinement coding of refinement coefficient R1,0, is carried out.

This behavior of interleaved significance and refinement coding generates a problem when the refinement coding is done by grouping of multiple (for example, three) refinement coefficients. At the encoder side, three refinement symbols are buffered up before a VLC code word is sent out. But at the decoder side, whenever the decoding of a refinement coefficient is encountered, the decoder will attempt to read from the bitstream a VLC code word representing a group of three refinement symbols. But this code word is still buffered in the encoder's encoding buffer and has not yet been sent. The loss of sync between the encoder and the decoder means such a coding scheme (grouping of refinement symbols when significance and refinement passes are interleaved) will fail. Two solutions are provided to solve this problem and are provided below.

Figure 14:
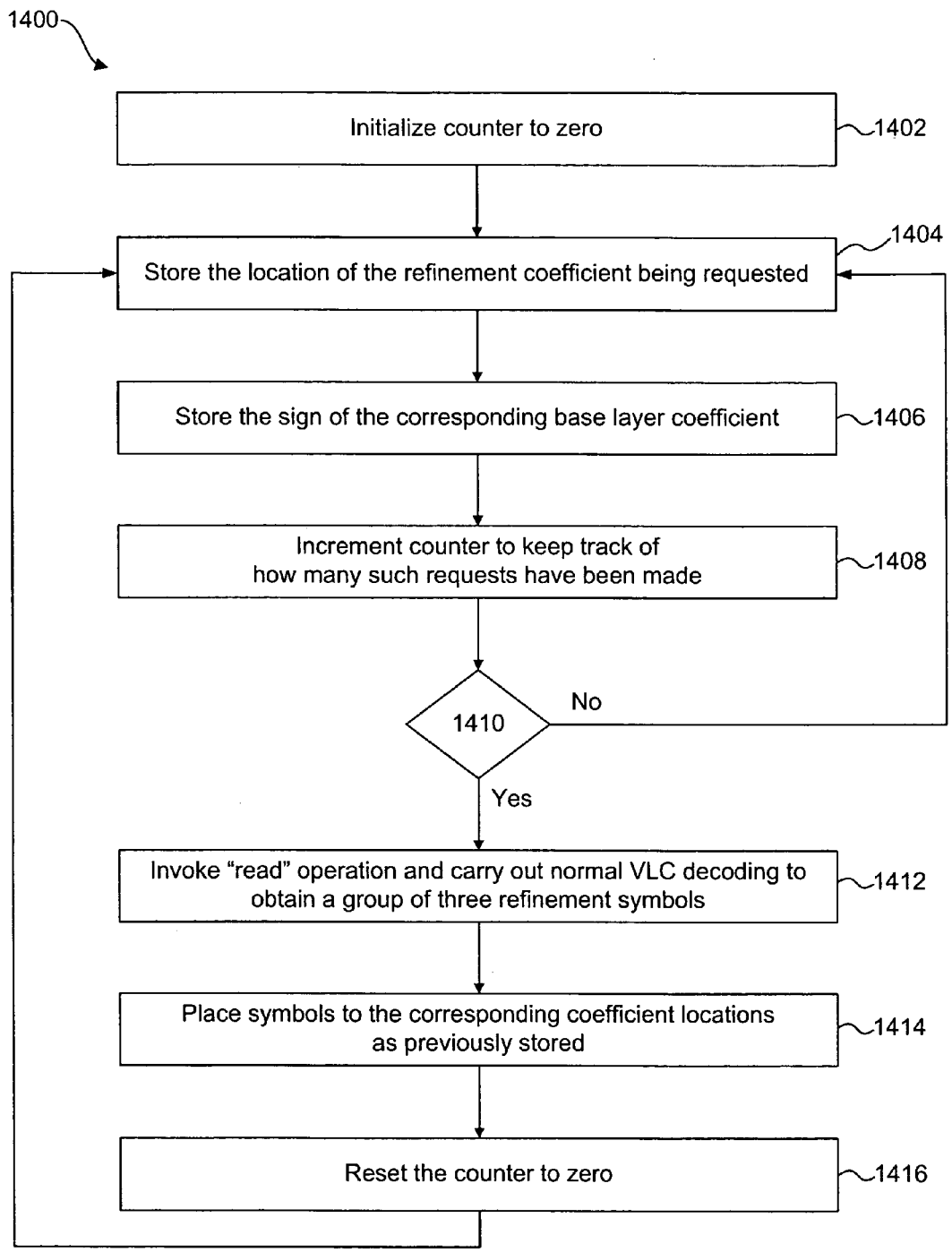
FIG. 14 illustrates one embodiment of a method of a decoder-based solution.

FIG. 14 illustrates a method of a decoder-based solution 1400 that requires no change at the encoder side. The encoder may always try to group every three refinement symbols together before sending out a codeword. At the decoding side, when a refinement coefficient is requested, the following operations are carried out. The method 1400 begins by initializing 1402 a counter to zero. The location of the refinement coefficient being requested is stored 1404, the sign of the corresponding base layer coefficient is stored 1406, a counter (initialized to zero at the start of the slice decoding) is incremented to keep track of how many such requests have been made 1408, if this counter reaches three 1410, a "read" operation is invoked 1412 and normal VLC decoding is carried out. A group of three refinement symbols are returned, which are then dispensed back to the corresponding coefficient locations as previously stored 1414, and the counter is reset to zero 1416. If the counter is not yet three 1410, the method 1400 returns to step 1402 and continues on.

Figure 15:
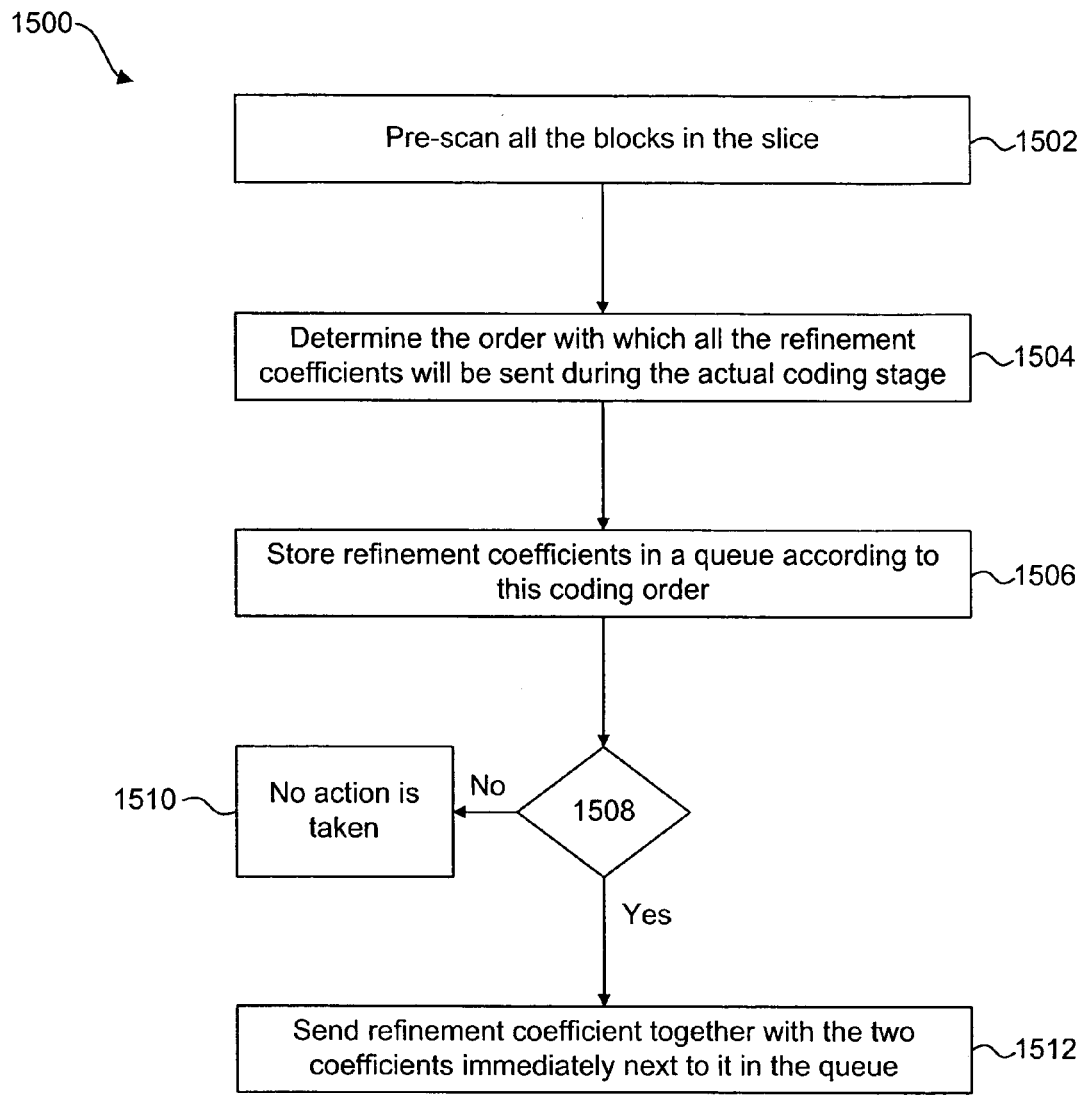
FIG. 15 illustrates one embodiment of a method of an encoder-based solution.

While the decoder-side solution places more burdens on the decoder, the encoder-side solution has minimal complexity impact on the decoder. The basic concept is that the encoder always sends in advance multiple (for example, three) refinement coefficients, the decoder is guaranteed to have sufficient refinement symbols exist in the buffer when a refinement coefficients is requested. FIG. 15 illustrates a method 1500 of one type of encoder-based solution. The encoder pre-scans 1502 a certain number of blocks in the slice and determines the order 1504 with which all the refinement coefficients will be sent during the actual coding stage. Along the way the refinement coefficients are stored 1506 in a queue according to this coding order. At the coding stage, when a refinement coefficient needs to be sent, it is determined 1508 whether it has been grouped together with previous coefficient(s) and already sent out. If so, then no action is taken 1510; otherwise, this refinement coefficient is sent 1512 together with the two coefficients immediately next to it in the queue. The method 1500 continues on until the coding pass is over.

Note that both the encoder-based and the decoder-based solutions apply to any type of interleaving of the significance pass and the refinement pass from different blocks, including but not limited to the two coding orders currently supported in the SVC draft recommendation. These two solutions also apply to grouping of any number of refinement symbols, and are not just limited to grouping of three symbols.

It should be also noted that both the decoder-based and encoder-based solutions can be applied to the block-based refinement coding as defined in SVC Joint Draft 5 (JD5), thus making it unnecessary to flush out the remaining refinement bits stored in the buffer at the end of every block. For the decoder-based solution, a further change at the encoder side can guarantee encoder and decoder synchronization. Because the block-based refinement coding scheme in JD5 adapts the VLC table, the number of grouped refinement symbols can change among 1, 3, and 4. At the end of a block, the encoder should suspend the VLC table adaptation until it encounters sufficient number of refinement coefficients (this will happen some time later as the encoder carries out the refinement coding of the subsequent blocks). When sufficient refinement coefficients have been encountered to invoke a write operation of a VLC code word, the encoder can resume the normal VLC table adaptation. Under this scheme, the frequent flushing operation (done one every block) as used in the current refinement coding can be minimized, and coding performance can be greatly improved.

At the end of coding a certain number of refinement coefficients, a flushing operation may be used if the number of remaining refinement coefficients is not zero and is less than the group size used in a typical coding process. One way of performing the flushing operation is to add the most probable symbols to make a complete group, and code the last group as other groups. For example, assume that the typical group size is assumed to be 3, that there is one remaining coefficient to be coded in the flushing operation, and that the symbol is 2. The group (2, 0, 0) will be coded, assuming the symbol "0" is the most probable symbol in the ternary symbol set. At the decoder side, these padded symbols are discarded. Flushing operations may also be performed more frequently to reduce the implementation complexity. A group of refinement coefficients that are coded together are from different locations. Limiting the distance among the coefficients in the same group will result in some un-grouped symbols that need to be handled by flushing operations. In another embodiment, instead of forming a complete group by adding the most probable symbols which will be discarded by the decoder, the VLC tables designed for coding smaller groups are used. This may be used when the number of refinement coefficients to be flushed will be known exactly by the decoder. Assume the group size is 3, and there is only one coefficient "R" to be flushed. Instead of coding the group (R, 0, 0) using the VLC tables for coding group of 3 symbols, it is more efficient to use a special VLC table. For example, a refinement symbol of value "0" is coded as "1", a refinement symbol of value "1" is coded as "01" and a refinement symbol of value "2" is coded as "00". Similarly, if the group size is 3, and there are two coefficients, "R1" and "R2", to be flushed. Instead of coding the group (R1, R2, 0), different VLC tables can be used for coding the smaller group (R1, R2). In one embodiment, the Exponential-Golomb code is used for coding the index of the group which is calculated as R1*3+R2. It is to be noted that equivalently the index of the group coded can also be formed as R1+R2*3.

Figure 16:
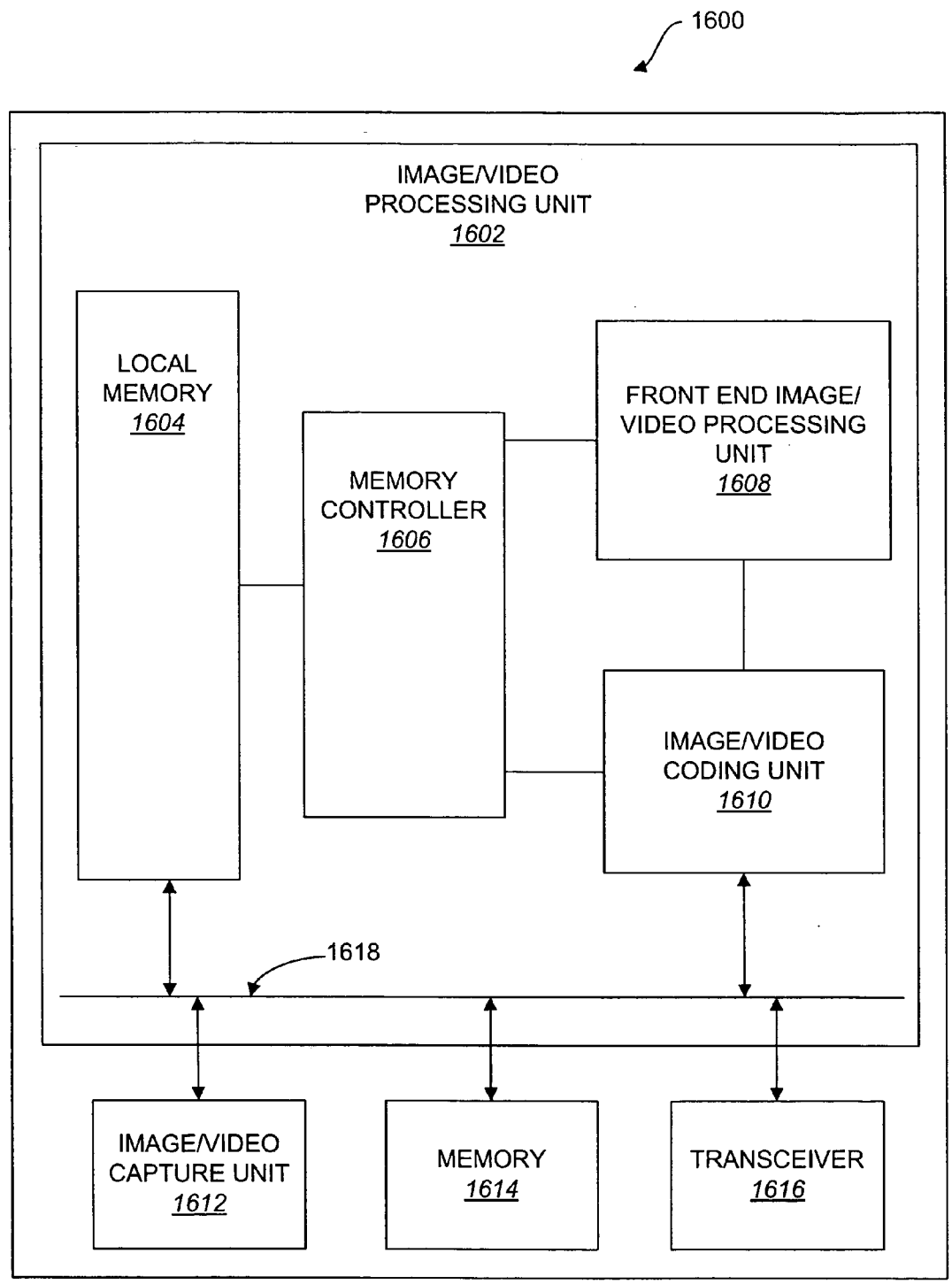
FIG. 16 illustrates a block diagram illustrating major hardware components typically utilized to process digital images and/or digital video.

FIG. 16 illustrates a device 1600 configured to process digital images and/or digital video. The device 1600 may represent or be implemented in a digital television, a digital direct broadcast system, a wireless communication device, a personal digital assistant (PDA), a laptop computer, a desktop computer, a digital camera, a digital recording device, a network-enabled digital television, a cellular or satellite radio telephone, or any telecommunication device with video telephony (VT) capabilities.

The device 1600 may process, encode, decode, transmit and/or receive image and/or video data. The video data may be captured by a video camera, such as a video capture unit (or image sensor) 1612, retrieved from a video archive, or obtained in another manner. A video coding unit 1610 in the device 1600 may use a video coding standard such as MPEG-4, ITU-T H.263, ITU-T H.264, or any other video coding standard. The video coding unit 1610 may support inter-frame coding techniques, such as motion estimation and motion compensation, and intra-frame coding techniques, such as spatial estimation and intra-prediction coding techniques.

The device 1600 may include an image/video capture device 1612, such as a camera or video camera, to capture images or video sequences and store the captured images or sequences in a memory 1614. An image/video processing unit 1602 may process images and/or video sequences. The memory 1604 may store the images and/or video sequences before and after such processing.

A transceiver 1616 may receive and/or transmit coded video sequences to another device. The transceiver 1616 may use a wireless communication standard such as code division multiple access (CDMA). Examples of CDMA standards include CDMA 1xEV-DO, WCDMA, etc.

One or more elements of the device 1600 may be communicatively coupled via a communication bus 1618. In addition to or instead of the elements shown in FIG. 16, other elements may be included in the device 1600. The architecture illustrated in FIG. 16 is merely an example. The techniques described herein may be implemented with a variety of other architectures.

The memory 1614 may have a relatively large memory space. The memory 1614 may comprise dynamic random access memory (DRAM), or FLASH memory. The memory 1614 may comprise "NOR" or "NAND" gate memory technology, or any other data storage technology. In other examples, the memory 1614 may comprise a non-volatile memory or any other type of data storage unit.

The image/video processing unit 1602 may comprise a chip set for a mobile radiotelephone, which may include hardware, software, firmware, and/or one or more microprocessors, digital signal processors (DSPs), application specific integrated circuits (ASICs), field programmable gate arrays (FPGAs), or various combinations thereof. The processing unit 1602 may include a local memory 1604 coupled to a front-end image/video processing unit 1608 and an image/video coding unit 1610. The coding unit 1610 may comprise an encoder/decoder (CODEC) for encoding (or compressing) and decoding (or decompressing) digital video data.

The local memory 1604 may comprise a smaller and faster memory space relative to the memory 1614. For example, the local memory 1604 may comprise synchronous dynamic random access memory (SDRAM). The local memory 1604 may comprise "on-chip" memory integrated with the other components of the processing unit 1602 to provide fast access to data during a processor-intensive coding process. However, the memories 1614 and 1604 may be combined into one memory, or may be implemented in a number of other configurations. A memory controller 1606 may control memory fetches and write-backs to the local memory 1604.

The front-end image/video processing unit 1608 may perform one or more image processing techniques on the frames of a video sequence to improve image quality, and thereby improve the quality of a video sequence. For example, the front-end image/video processing unit 1608 may perform techniques such as demosaicing, lens rolloff correction, scaling, color correction, color conversion, and spatial filtering.

The front-end image/video processing unit 1608 may also perform other techniques. In general, the techniques performed by the unit 1608 are referred to as "front-end" image processing techniques because the techniques precede coding by the image/video coding unit 1610.

The image/video capture unit 1612 may comprise image sensors that include color filter arrays (CFAs) arranged on a surface of the sensors. Front-end image processing performed by the unit 1608 may improve the quality of the video sequence captured by the capture unit 1612. For example, the front-end processing unit 1608 and/or the coding unit 1610 may comprise a DSP programmed to process images captured by the capture unit 1612. The same area of memory 1604 (or memory 1614) may used for both front-end image processing purposes and for other storage purposes.

The image/video coding unit 1610 may perform image and/or video coding, which may include one or more video compression techniques, such as inter-frame compression and/or intra-frame compression. For example, the coding unit 1610 may implement motion estimation and motion compensation techniques to exploit temporal or inter-frame data correlation to provide inter-frame compression. Alternatively or additionally, the coding unit 1610 may perform spatial estimation and intra-prediction techniques to exploit spatial or intra-frame data correlation to provide intra-frame compression. The output of motion compensation (or intra-prediction) is referred to as "residual," and may comprise a block of data indicative of differences between a current video block to be coded and a prediction block identified by motion estimation or spatial estimation.

After the coding unit 1610 performs motion compensation (or intra-prediction) to create the residual, a series of additional steps may be performed to further code the residual and further compress the data. The additional steps may depend on the coding standard being used, but are generally referred to as "residual coding." The coding unit 1610 may perform one or more of these video compression techniques to reduce the amount of data needed to communicate a video sequence to another device via the transceiver 1616.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present disclosure. In other words, unless a specific order of steps or actions is required for proper operation of the embodiment, the order and/or use of specific steps and/or actions may be modified without departing from the scope of the present disclosure.

While specific embodiments and applications of the present disclosure have been illustrated and described, it is to be understood that the disclosure is not limited to the precise configuration and components disclosed herein. Various modifications, changes, and variations which will be apparent to those skilled in the art may be made in the arrangement, operation, and details of the methods and systems of the present disclosure disclosed herein without departing from the spirit and scope of the disclosure.

What is claimed is:

1. A method for coding refinement coefficients in a signal-to-noise ratio (SNR) scalable enhancement layer of a compressed video sequence comprising:
    receiving a video sequence;
    constructing a predicted video signal in a current frame from the video sequence;
    forming a residual signal by subtracting the predicted video signal from the original video signal in the current frame;
    applying a transform to the residual signal;
    quantizing a plurality of transform coefficients;
    mapping a refinement coefficient to a ternary refinement symbol, wherein each ternary refinement symbol has one of three values indicating a change in sign or transition to zero of the refinement coefficient from a first layer to an enhancement layer;
    grouping the refinement symbols in a certain coding order; and
    coding the refinement symbol groups using variable length codes.

2. The method of claim 1, further comprising using a variable length coding table adaptively selected for different enhancement layers.

3. The method of claim 1, further comprising using a variable length coding table adaptively selected based on a probability estimation of the refinement symbols.

4. The method of claim 2, wherein the selection of a specific variable length coding table is based on a level of an enhancement layer.

5. The method of claim 4, wherein the selection of the specific variable length coding table is based on whether a coefficient is being refined for the first time or whether the coefficient has been refined in a previous layer.

6. The method of claim 1, further comprising:
interleaving significant coefficients and refinement coefficients;
identifying a slice that includes a plurality of blocks;
scanning the plurality of blocks before the grouping of the refinement coefficients;
determining an order with which the refinement coefficients will be coded; and
storing the refinement coefficients in a queue according to the order that was determined.

7. The method of claim 1, further comprising identifying a slice that includes a plurality of blocks.

8. The method of claim 1, further comprising scanning the plurality of blocks before the grouping of the refinement coefficients.

9. The method of claim 1, further comprising determining an order with which the refinement coefficients will be coded.

10. The method of claim 1, further comprising storing the refinement coefficients in a queue according to the order that was determined.

11. The method of claim 1, wherein every fixed-number of consecutive refinement coefficients are coded together using the variable length coding table.

12. The method of claim 1, further comprising grouping refinement coefficients of a slice together.

13. The method of claim 1, further comprising performing a flushing operation.

14. The method of claim 13, wherein the flushing operation includes adding one or more most probable symbols to one or more refinement symbols to make a complete group.

15. The method of claim 13, wherein the flushing operation includes using a variable length coding table which is selected based on the number of refinement coefficients to be processed in the flushing operation.

16. The method of claim 1, wherein the variable length coding table comprises a 27-entry variable length coding table, wherein the group length is three.

17. The method of claim 1, further comprising using the subband-based coding order on the enhancement layer.

18. An electronic device that is configured to encode refinement coefficients in a signal-to-noise ratio (SNR) scalable enhancement layer of a compressed video sequence, the electronic device comprising:
a processor;
memory in electronic communication with the processor;
instructions stored in the memory, the instructions being executable to:
receive a video sequence;
construct a prediction of an original video signal in a current frame from the video sequence;
form a residual frame by subtracting the prediction of the original video signal from the original video signal in the current frame;
apply a transform to the residual signal;
quantize a plurality of transform coefficients;
map a refinement coefficient to a ternary refinement symbol, wherein each ternary refinement symbol has one of three values indicating a change in sign or transition to zero of the refinement coefficient from a first layer to an enhancement layer;
group refinement symbols in a certain coding order; and
code the refinement symbol groups using variable length codes.

19. The electronic device of claim 18, wherein the instructions are further executable to use a variable length coding table adaptively selected for different enhancement layers.

20. The electronic device of claim 18, wherein the electronic device is configured to interleave significant coefficients and refinement coefficients, and wherein the instructions are further executable to:
identify a slice that includes a plurality of blocks;
scan the plurality of blocks before the grouping of the refinement coefficients;
determine an order with which the refinement coefficients will be coded; and
store the refinement coefficients in a queue according to the order that was determined.

21. A non-transitory computer-readable medium comprising executable instructions for coding refinement coefficients in a signal-to-noise ratio (SNR) scalable enhancement layer of a compressed video sequence, the instructions comprising:
receiving a video sequence;
constructing a prediction of an original video signal in a current frame from the video sequence;
forming a residual signal by subtracting the prediction of the original video signal from the original video signal in the current frame;
applying a transform to the residual signal;
quantizing a plurality of transform coefficients;
mapping a refinement coefficient to a ternary refinement symbol, wherein each ternary refinement symbol has one of three values indicating a change in sign or transition to zero of the refinement coefficient from a first layer to an enhancement layer;
grouping refinement symbols in a certain coding order; and
coding the refinement symbol groups using variable length codes.

22. A method for decoding refinement coefficients in an encoded video sequence comprising:
receiving an encoded video sequence;
decoding ternary refinement symbols using a variable length coding table, wherein each ternary refinement symbol has one of three values indicating a change in sign or transition to zero of the refinement coefficient from a first layer to an enhancement layer;
decoding refinement coefficients using the ternary refinement symbols, wherein the refinement coefficients were grouped in a certain coding order;
dequantizing a plurality of transform coefficients;
applying an inverse transform to a refinement signal; and
constructing a video sequence.

23. The method of claim 22, further comprising using different variable length coding tables adaptively selected for different enhancement layers.

24. The method of claim 22, wherein the encoded video stream includes interleaved significant symbols and refinement symbols, further comprising:
storing a location of the refinement coefficient being requested;
storing a sign of the corresponding base layer coefficient; and
incrementing a counter that relates to a number of requests made.

25. The method of claim 24, further comprising:
determining if the counter reaches a predefined count; and
invoking a read operation and causing normal variable length coding table decoding to obtain a group of refinement symbols.

26. The method of claim 25, further comprising storing the group of refinement symbols to the corresponding locations as previously stored.

27. The method of claim 22, further comprising performing a flushing operation.

28. The method of claim 27, wherein the flushing operation includes discarding padded symbols.

29. The method of claim 27, wherein the flushing operation includes using a variable length coding table which is selected based on the number of refinement coefficients to be processed in the flushing operation.

30. An electronic device that is configured to encode refinement coefficients in a signal-to-noise ratio (SNR) scalable enhancement layer of a compressed video sequence, the electronic device comprising:

means for receiving a video sequence;

means for constructing a prediction of an original video signal in a current frame from the video sequence;

means for forming a residual frame by subtracting the prediction of the original video signal from the original video signal in the current frame;

means for applying a transform to the residual signal;

means for quantizing a plurality of transform coefficients;

means for mapping a refinement coefficient to a ternary refinement symbol, wherein each ternary refinement symbol has one of three values indicating a change in sign or transition to zero of the refinement coefficient from a first layer to an enhancement layer;

means for grouping refinement symbols in a certain coding order; and means for coding the refinement symbol groups using variable length codes.

* * * * *